United States Patent
Bosarge (10) Patent No.: US 8,934,062 B1
(45) Date of Patent: Jan. 13, 2015

(54) DIGITAL VEHICLE DISPLAY UNIT AND REMOTE

(76) Inventor: Roger Bosarge, Jacksonville, FL (US)

( * ) Notice: Subject to any disclaimer, the term of this patent is extended or adjusted under 35 U.S.C. 154(b) by 615 days.

(21) Appl. No.: 13/327,160

(22) Filed: Dec. 15, 2011

Related U.S. Application Data (60) Provisional application No. 61/424,224, filed on Dec. 17, 2010.

(51) Int. Cl.
*H04N 5/64* (2006.01)
*B60R 11/02* (2006.01)
*B60N 2/48* (2006.01)

(52) U.S. Cl.
CPC .......... *B60R 11/0235* (2013.01); *B60N 2/4876* (2013.01)
USPC ....................................................... 348/837

(58) Field of Classification Search
CPC .............................. B60R 11/0235; H04N 5/64
USPC ....................................................... 348/837
See application file for complete search history.

(56) References Cited

U.S. PATENT DOCUMENTS

| | | | |
|---|---|---|---|
| 2001/0033344 A1* | 10/2001 | Grein et al. | 348/794 |
| 2002/0005917 A1* | 1/2002 | Rosen | 348/837 |
| 2003/0137584 A1* | 7/2003 | Norvell et al. | 348/61 |
| 2004/0032543 A1* | 2/2004 | Chang | 348/837 |
| 2004/0189881 A1* | 9/2004 | Cook et al. | 348/837 |
| 2005/0062597 A1* | 3/2005 | Su | 340/475 |
| 2006/0098403 A1* | 5/2006 | Smith | 361/683 |
| 2008/0036925 A1* | 2/2008 | Hsiao | 348/837 |
| 2009/0160732 A1* | 6/2009 | Kimura | 345/1.1 |
| 2009/0280824 A1* | 11/2009 | Rautiainen | 455/456.1 |
| 2010/0039366 A1* | 2/2010 | Hardy | 345/102 |

* cited by examiner

*Primary Examiner* — Sath V Perungavoor
*Assistant Examiner* — Peter D Le
(74) *Attorney, Agent, or Firm* — H. John Rizvi; Gold & Rizvi P.A.

(57) ABSTRACT

Disclosed herein is a digital vehicle display that displays custom digital images and/or text from a vehicle and is controlled via a wireless device. Digital images and/or is uploaded to a digital display unit via an SD card, a USB storage device, or transmitted wirelessly from a computer or cellular telephone. A cellular telephone, computer, or a remote control can be used to select which image is displayed and control the zoom. The remote control may also send a panic signal to the display unit to broadcast an emergency signal containing the GPS coordinates of the vehicle. The display unit is affixed to the vehicle using a trailer hitch, a suction cup, a magnetic panel, or a lip, which fits over a window. The digital display unit is powered by trailer electrical connections and is equipped with two rows of LED's to indicate braking and turning.

18 Claims, 11 Drawing Sheets

DIGITAL VEHICLE DISPLAY UNIT AND REMOTE

CROSS REFERENCE TO RELATED APPLICATION

This Non-Provisional Utility application claims the benefit of U.S. Provisional Patent Application Ser. No. 61/424,224, filed on Dec. 17, 2010, which is incorporated herein in its entirety.

FIELD OF THE INVENTION

The present disclosure generally relates to a digital vehicle display unit. More particularly, the present disclosure relates to an electronic screen which is capable of displaying user uploaded images and/or text from a vehicle wherein the image and/or text can be selected via a wireless device.

BACKGROUND OF THE INVENTION

Drivers are constantly looking for ways to personalize their vehicles. Some examples of such are decals, flags, bumper stickers, and vanity plates which display logos of organizations, political candidates, sports teams, and the like. By displaying these items, the driver is able to indicate to other motorists' support of a particular team or organization, or simply convey a message.

The problem with the aforementioned items is that they are all permanent to semi-permanent and do not offer the ability to rapidly change or customize the images and/or text which is displayed. Furthermore, these items are typically generic in nature, or require significant time and cost to customize. In addition, the images and/or text are static and do not afford the ability for the driver to change them on a whim.

What is desired is a display technology that is capable of storing and rapidly changing the image and/or text, which is displayed from a wireless device. This would enable drivers to upload custom digital images and/or text and change what is displayed instantaneously.

SUMMARY OF THE INVENTION

The basic inventive concept provides a device for displaying digital images from a vehicle and controlling what is displayed on screen via a wireless device.

A first aspect of the present invention provides a device for displaying and controlling digital images from a vehicle comprising:

a digital display screen comprising a display left side, a display right side, a display upper edge, and a display lower edge;

at least one light emitting component panel comprising a series of light emitting components, the at least one light emitting component panel being located proximate at least one of the display upper edge and the display lower edge, respectively:

an image processing circuit in signal communication with the digital display screen and each at least one light emitting component panel;

a digital storage device in signal communication with the image processing circuit;

an input interface for transferring digital images to the digital storage device;

a wireless interface for receiving wireless transmissions comprising operational control instructions;

a display enclosure comprising an enclosure left side, an enclosure right side, an enclosure upper edge, an enclosure lower edge, and an enclosure rear surface collectively forming an enclosure interior volume for housing the digital display screen, the at least one light emitting component panel, and the wireless interface; and an attachment interface carried by and extending rearward from the display enclosure for removably securing the display enclosure to a vehicle.

Another aspect of the present invention is that the digital display unit has a screen, which is capable of displaying digital images and/or text.

A further aspect of the digital display unit is that it is capable of storing digital images and/or text in a digital storage device.

In yet another aspect, the images and/or text can be uploaded to said digital storage device via an SD card slot, a USB connection, or over a wireless connection.

A further aspect of the digital display unit is that it has two rows of light emitting diodes (LED's).

Another aspect of the digital display unit is that the LED's are illuminated to indicate braking.

A further aspect of the present invention is that half of each LED row may be illuminated to indicate a turn signal.

In yet another aspect of the digital display unit is that it is housed in a gasket, which provides a weatherproof container.

In a further aspect, said gasket may be attached to a suction cup to allow said digital display unit to be affixed to any part of the vehicle.

In another aspect, said gasket may have a magnet which can be affixed to any metallic portion of a vehicle.

A further aspect of the digital display unit is that said gasket may have a lip such that it may be affixed to a window.

In yet another aspect, said gasket may have a shank extending from the rear face.

In a further aspect, said shank has a cavity which is capable of fitting the ball section of a trailer hitch.

Another aspect of the present invention is that said shank has a hole completely through it, which allows a pin to be placed through the hole.

A further aspect of the digital display unit is that it is powered by standard trailer electrical connections.

In yet another aspect, said standard trailer electrical connections are also used to control the LED rows for indicating breaking or turning.

Another aspect of the present invention is said digital display unit contains at least one antenna capable of sending and receiving wireless data.

In yet another aspect of the present invention is that said antenna operates in the Bluetooth, Wi-Fi, cellular telephone, or other radio frequencies.

A further aspect of the digital display unit is that commands or digital images and/or text may be relayed over said antenna.

Another aspect of the digital display unit is that the commands and images may be sent from a computer, a cell phone, or a remote control.

In a further aspect of the present invention, said commands comprise selecting a digital image and zooming in or out of a digital image.

In yet another aspect, the display unit optionally contains a GPS antenna to provide GPS coordinates to the digital display unit.

While in another aspect, the digital display unit is capable of broadcasting an emergency signal with GPS coordinates over any radio frequency.

A further aspect of the present invention is that it is accompanied by a remote control.

In another aspect, the remote control can communicate with the digital display unit over a wireless protocol.

A further aspect of the remote control is that the wireless protocol comprises Bluetooth, Wi-Fi, or cellular telephone radio frequencies.

And in another aspect, the remote control has a display screen that shows what is currently displayed on said digital display unit.

In a further aspect, the remote control has at least one button that can send a signal to the digital display unit which will select the next available digital image and/or text stored in said digital storage device and output said digital image and/or text to the display screen.

In yet another aspect, said remote control has at least one button which sends a signal to the digital display unit to control the zoom of the digital image and/or text that is displayed.

Another aspect of the present invention is that the control has a panic button, which sends a signal to the digital display unit to broadcast said emergency signal.

In yet another aspect of the invention is a method for displaying and controlling digital images from a vehicle comprising:

mounting a digital display device on a vehicle;
  uploading digital images and/or text to said digital display unit; and
  manipulating said images and/or text via a wireless device.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which:

FIG. 5 presents an exemplary depiction of how the electronic display would interface with various technologies, including, a cell phone, a computer, a remote control, a secure digital (SD) card, and universal serial bus (USB), and the like;

Like reference numerals refer to like parts throughout the various views of the drawings.

DETAILED DESCRIPTION OF THE INVENTION

Figure 1:
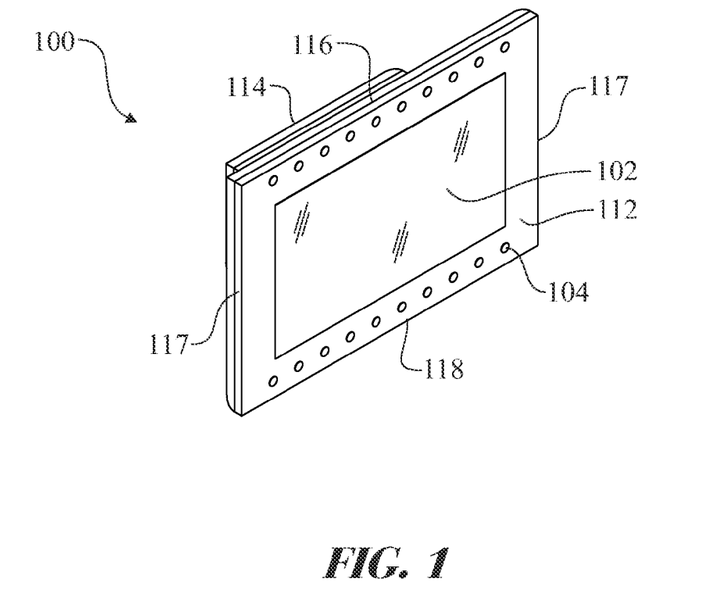
FIG. 1 presents an isometric view of an exemplary electronic display.
Figure 2:
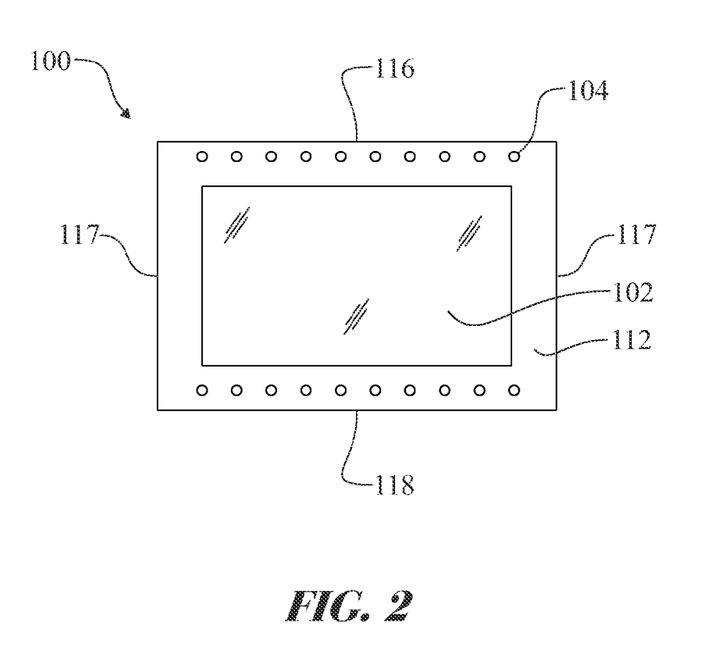
FIG. 2 presents a front view of the electronic display introduced in FIG. 1.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention provides a device for displaying digital images and/or text from a vehicle with the ability to change the image via a wireless device. Digital images and/or digital text are displayed on a vehicle portable display unit 100 as illustrated in FIGS. 1 through 5. The vehicle portable display unit 100 includes a flat panel display having a display unit front face 112, a display unit rear face 114, a display unit top edge 116, a display unit side face 117, and a display unit bottom face 118. On the display unit front face 112 is a display screen 102, where a digital image and/or text 300 is displayed. Above and below the display screen 102 are two light emitting component panels 120, which contain a plurality of light emitting components 104. The light emitting components 104 can be incandescent bulbs, light emitting diodes (LED's), halogen bulbs, and the like. The flat panel display of the display unit 100 can be a liquid crystal display, a plasma display, a thin cathode ray tube, and the like.

Figure 3:
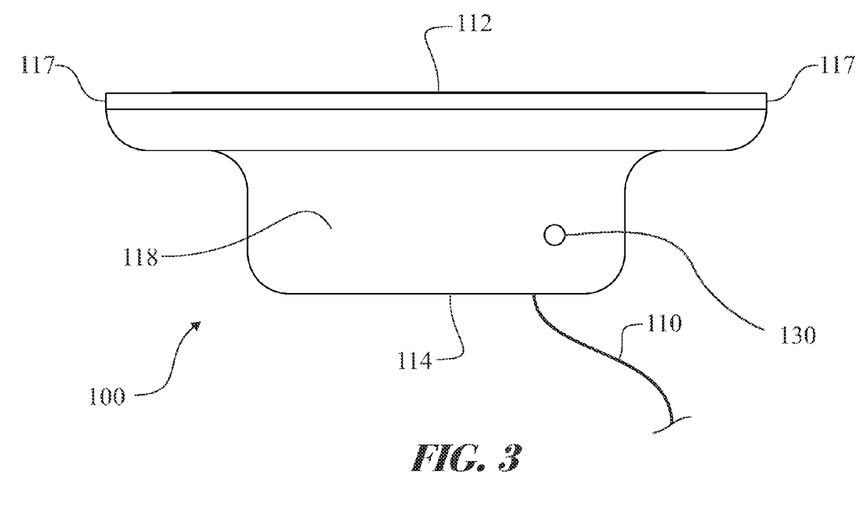
FIG. 3 presents a bottom view of the electronic display introduced in FIG. 1.
Figure 4:
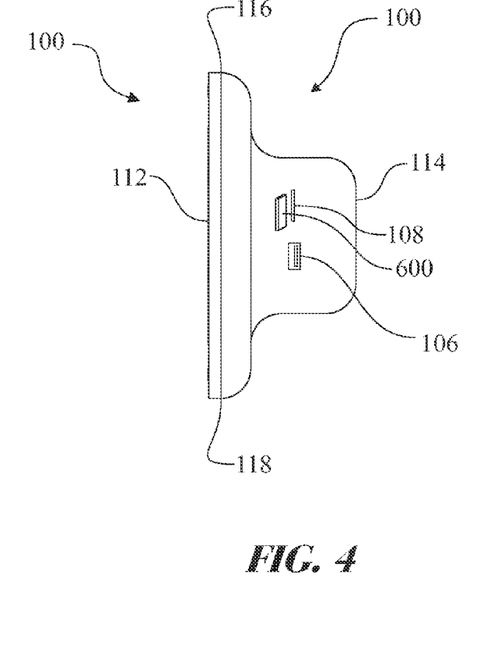
FIG. 4 presents a side view of the electronic display introduced in FIG. 1.

As shown on the display unit bottom face 118 in FIG. 3, power is delivered to the vehicle portable display unit 100 via a power connection 110. A universal serial bus (USB) port 106 and a secure digital (SD) port 108 are integrated into the vehicle portable display unit 100, such as on the display unit side face 117. The general form factor of the vehicle portable display unit 100 enables integration of the display screen 102, the light emitting component panels 120, and the circuitry required for operation thereof.

Figure 6:
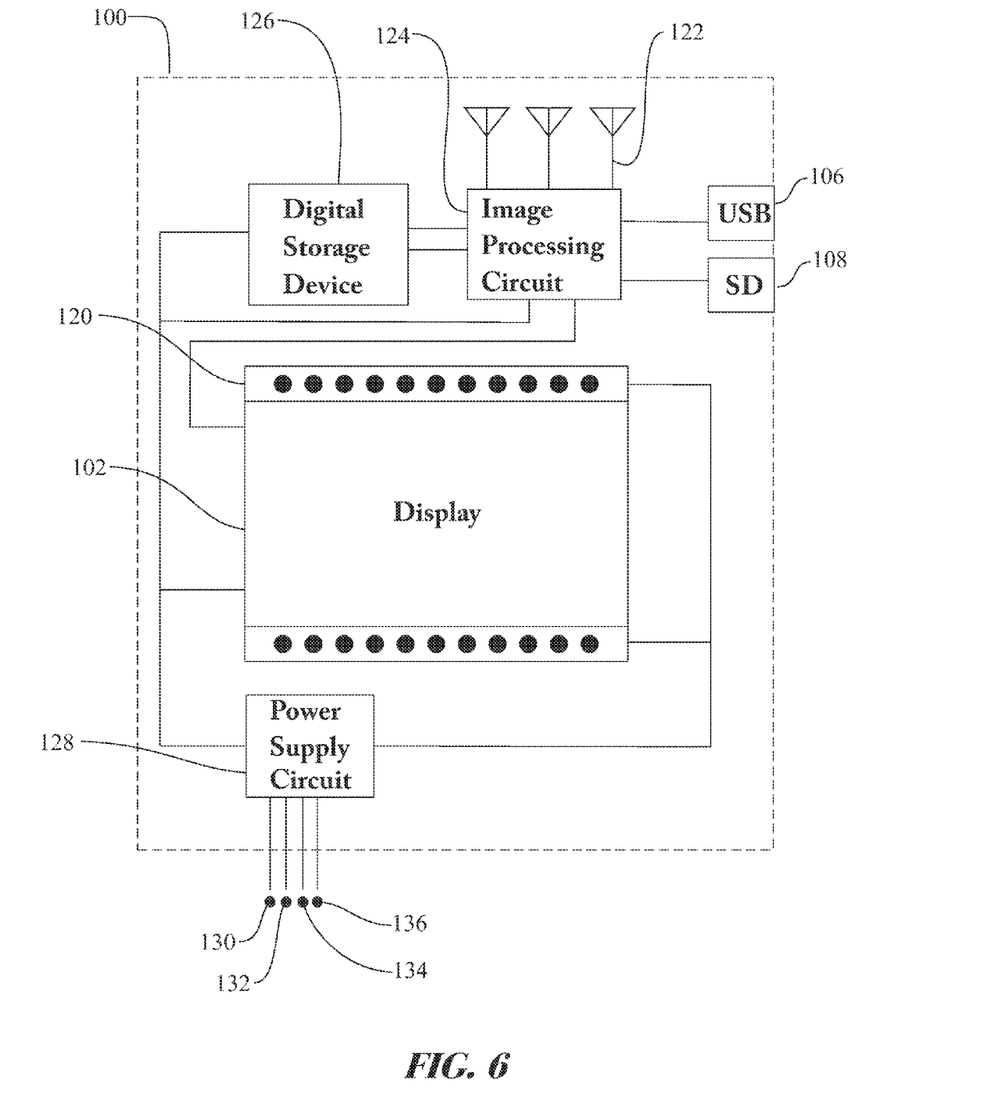
FIG. 6 presents an exemplary block diagram of the electronic display unit of FIG. 1.

The vehicle portable display unit 100 has at least one display unit antenna 122 as illustrated in the functional component schematic presented in FIG. 6. Each display unit antenna 122 is used to receive data. In certain configurations, the display unit antenna 122 may also transmit data. A separate display unit antenna 122 can be included for each included wireless protocol: radio frequency (RF), global positioning system (GPS), Bluetooth, Wi-Fi, and the like. Data received by each of a display unit antenna 122, universal serial bus (USB) port 106, or secure digital (SD) port 108 is forwarded to an image processing circuit 124. Digital data, representative of a digital image and/or digital text 300, is stored in a digital format within a digital storage device 126. The digital storage device 126 is a device that is capable of storing digital data. Those skilled in the art would consider the digital storage device 126 to be a magnetic hard drive or a solid-state memory device, and the like. If the data sent is to control the vehicle portable display unit 100, the selected digital image and/or text 300 is retrieved from the digital storage device 126 and manipulated as directed by any additional control commands received.

The vehicle portable display unit 100 can obtain electrical power from a standard trailer electrical connection. This connection is commonly a flat 4-pin connector arrangement. It is understood that the interface can be adapted to any trailer connector power coupling. Where necessary, an adapter can be used in order to connect the electrical wires from the trailer connection to the appropriate wires on the vehicle portable display unit 100. The vehicle portable display unit 100 requires a ground wire 130, a left turn signal wire 132, a right turn signal wire 134, and a 12V supply wire 136. All four wires are fed directly into a power supply circuit 128. The ground wire 130 and 12V supply wire 136 are used to power the display screen 102, digital storage device 126, and image processing circuit 124. The left turn signal wire 132 and right turn signal wire 134 are used to control the light emitting components 104 along the two light emitting component panels 120. The power supply circuit 128 is also capable of distinguishing the difference between a turning signal and a braking signal sent from through the trailer electrical connection. If a braking signal is sent, all light emitting components 104 are illuminated. If a turn signal is sent, half of each of the light emitting component panels 120 is illuminated indicating the direction of the turn.

In order to provide weatherproof housing for the vehicle portable display unit 100, it is placed into a display enclosure 200 such as exemplary display enclosures having any of the various mounting embodiments illustrated in FIGS. 7 through 15. The display enclosure 200 is fabricated having a left side, a right side, a front frame comprising a display hole 202, The display enclosure 200 fits the vehicle portable display unit 100 completely within a central cavity 204. In order for the screen to be visible, a display hole 202 is positioned in registration with the display screen 102. A series of LED holes 206 are positioned above and below the display hole 202 and aligned with the light emitting components 104 of the light emitting component panels 120. A power hole 208 provides access to the power connection 110. A porthole 210 provides access to the universal serial bus (USB) port 106 and secure digital (SD) port 108.

Figure 7:
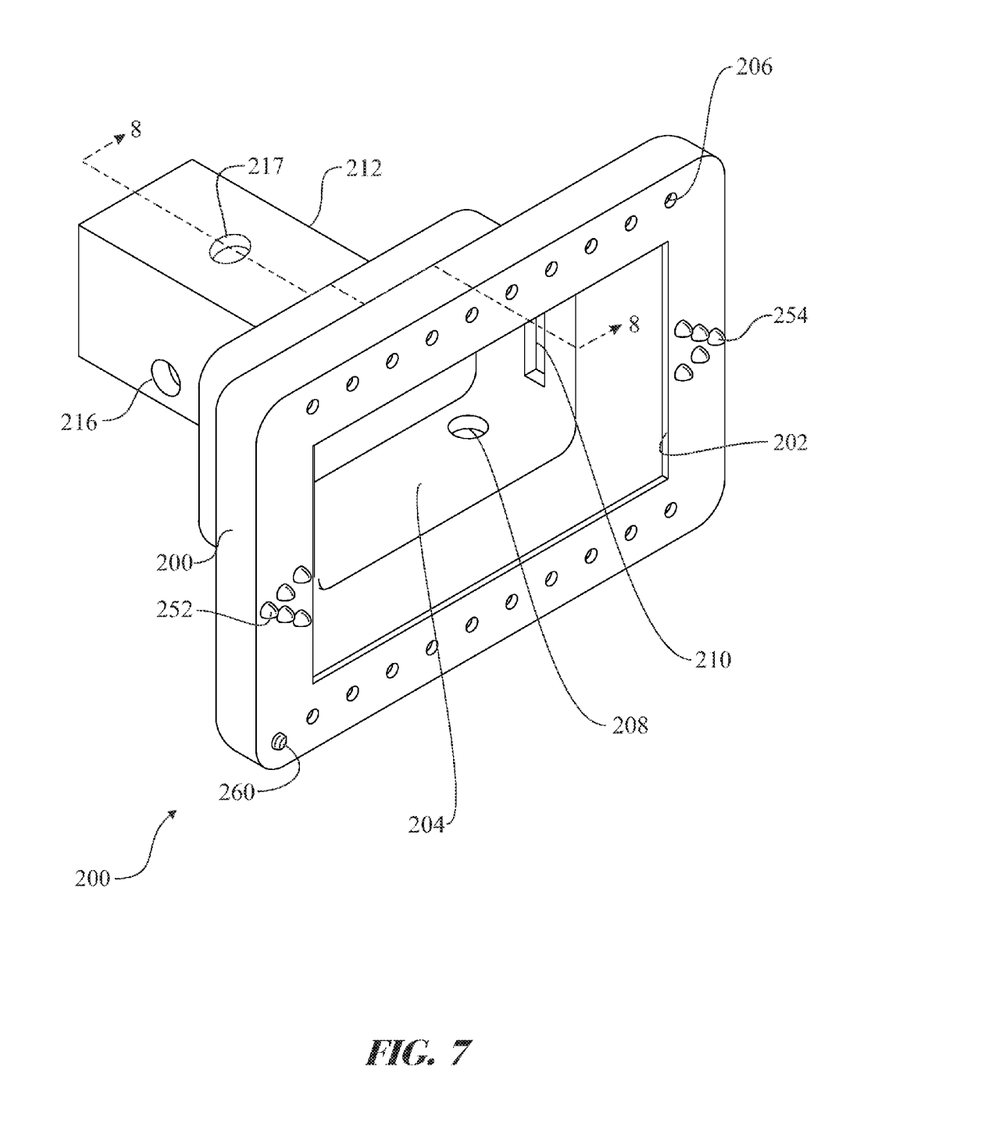
FIG. 7 presents an isometric view of an exemplary display cover for retaining the electronic display unit therein.
Figure 8:
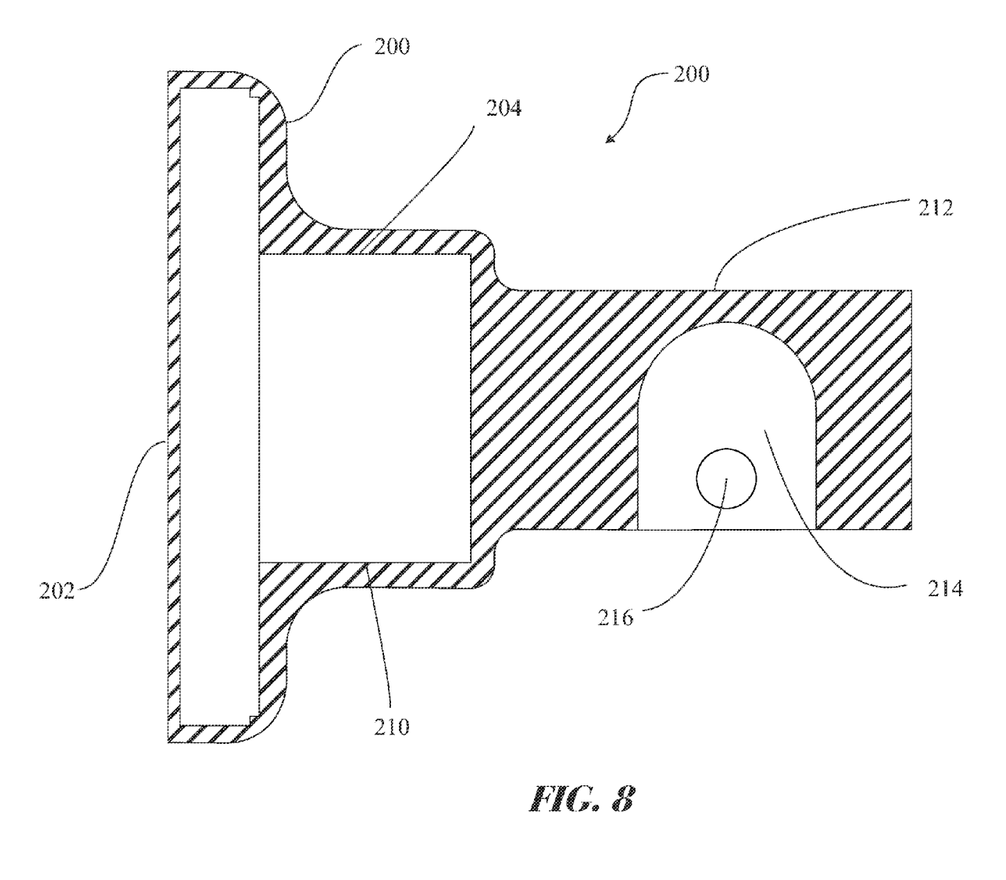
FIG. 8 presents a cross-sectional view of the holder for the electronic display unit, the section taken along section line 8-8 of FIG. 7.
Figure 9:
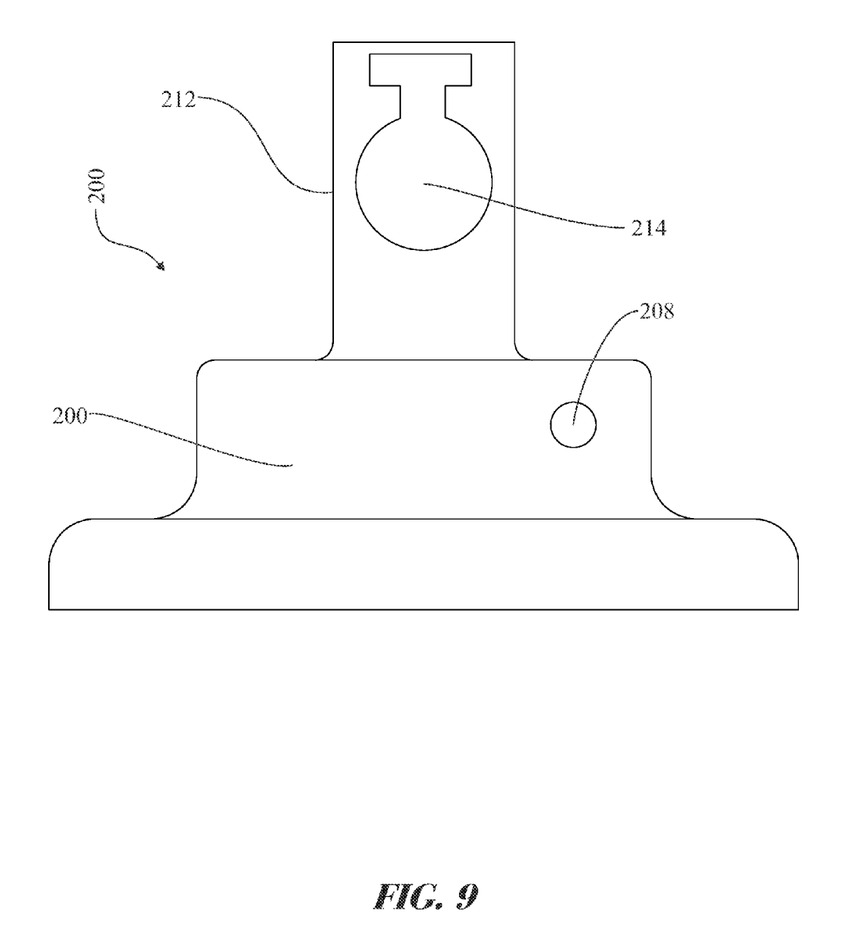
FIG. 9 presents a bottom view of the holder for the electronic display unit, as shown in FIG. 7.

The vehicle portable display unit 100 can be removably attached to a vehicle in a variety of manners. A first embodiment for attaching the vehicle portable display unit 100 to a vehicle using a trailer ball and hitch is shown in FIGS. 7 through 9. The display enclosure 200 is attached to a trailer shank 212. A trailer ball cavity 214 is created within the trailer shank 212 for housing a trailer ball. A trailer pinhole 216 is created in the trailer shank 212 dimensioned to accept a pin for securing the display enclosure 200 to the trailer hitch. A second trailer pin hole 217 is created in the trailer shank 212, the second trailer pin hole 217 being similarly sized and located along a length of the trailer shank 212 to the trailer pin hole 216, while being oriented perpendicularly to the trailer pin hole 216 allowing the user to rotate the display enclosure 200 by 90 degrees.

Figure 10:
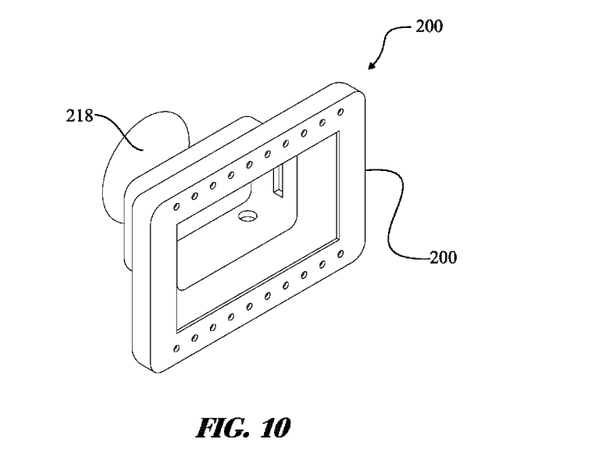
FIG. 10 presents an isometric view of the display cover comprising a second exemplary embodiment of the display unit attachment mechanism.
Figure 11:
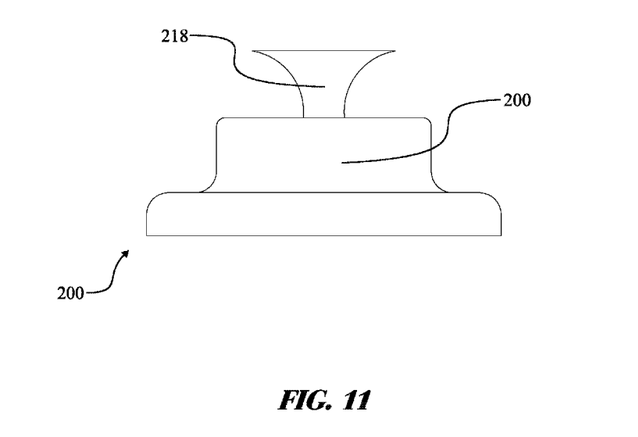
FIG. 11 presents a top view of the display cover comprising the second embodiment of the display unit attachment mechanism, as shown in FIG. 10.

A second exemplary embodiment of the vehicle portable display unit 100 includes a suction cup 218 for attachment, the embodiment being presented in FIGS. 10 and 11. The suction cup 218 is attached to the rear face of the display enclosure 200, so that the vehicle portable display unit 100 may be affixed to any part of the vehicle.

Figure 12:
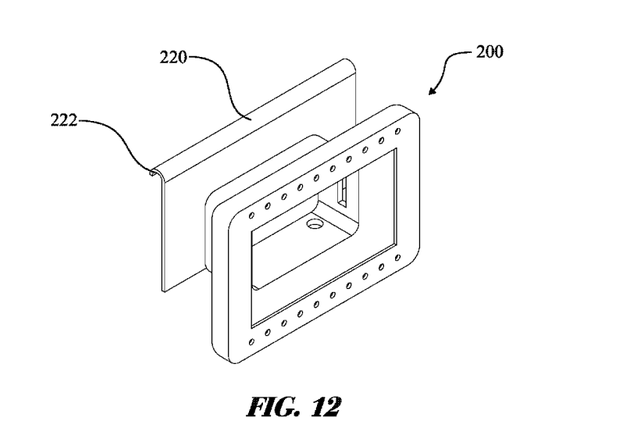
FIG. 12 presents an isometric view of the display cover comprising a third exemplary embodiment of the display unit attachment mechanism.
Figure 13:
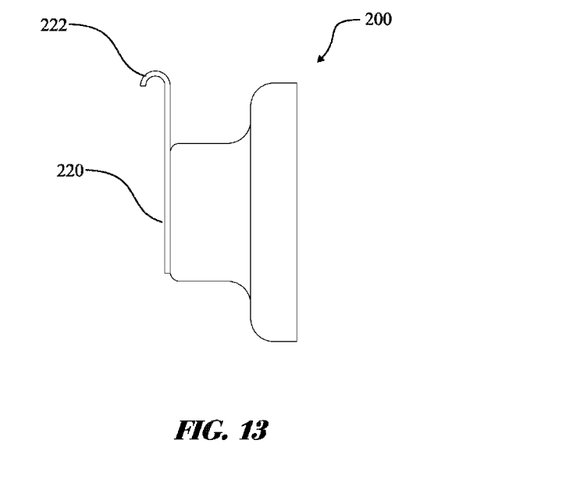
FIG. 13 presents a side view of the display cover comprising the third embodiment of the display unit attachment mechanism as shown in FIG. 12.

A third exemplary embodiment of the vehicle portable display unit 100 is shown in FIGS. 12 and 13. The display enclosure 200 is affixed to a window hanger 220. A curved portion 222 of the window hanger 220 fits over a vehicle window such that when the window is in the full up position, the display enclosure 200 is secured.

Figure 14:
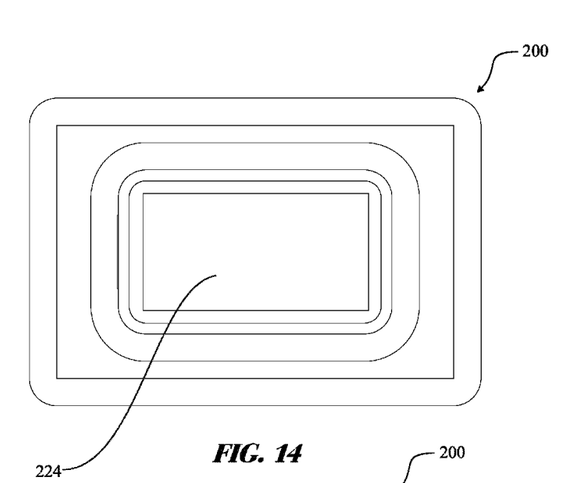
FIG. 14 presents a rear view of the display cover comprising a fourth embodiment of the display unit attachment mechanism.
Figure 15:
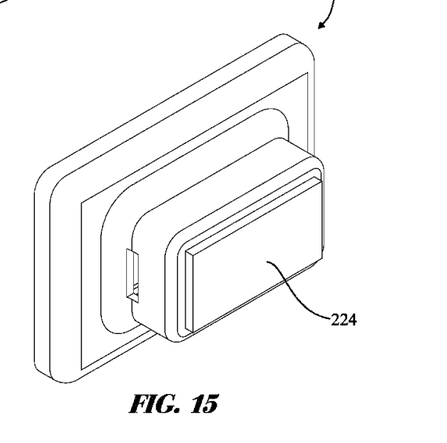
FIG. 15 presents an isometric rear view of the display cover comprising the fourth embodiment of the display unit attachment mechanism as shown in FIG. 14.

A fourth exemplary embodiment of the vehicle portable display unit 100 is shown in FIGS. 14 and 15. A magnetic plate 224 is affixed to the rear face of the display enclosure 200. The magnetic plate 224 allows the vehicle portable display unit 100 to be magnetically attached to any metallic component of the vehicle.

The display enclosure 200 can include an optional turn indicator system, such as a left turn signal indicator 252 and a right turn signal indicator 254 illustrated in FIG. 7. The left turn signal indicator 252 would be in electrical communication with the left turn signal wire 132. Similarly, the right turn signal indicator 254 would be in electrical communication with the right turn signal wire 134. The turn signal indicators 252, 254 can utilize type of any illuminating element, including light emitting diodes (LED's), incandescent bulbs, and the like. The turn signal indicators 252, 254 operate in accordance with commonly known turn signal indicators, including left indicating, right indicating, hazards, and optionally braking. Circuitry may be incorporated to adequately drive the LED's.

A strobe light 260 can be incorporated into the display enclosure 200 to provide an additional warning indicator to other drivers. The strobe light 260 can be activated by any number of conditions, including hard braking, a hazard signal, a driver request, sensing hazardous road or driving conditions, and the like.

Figure 5:
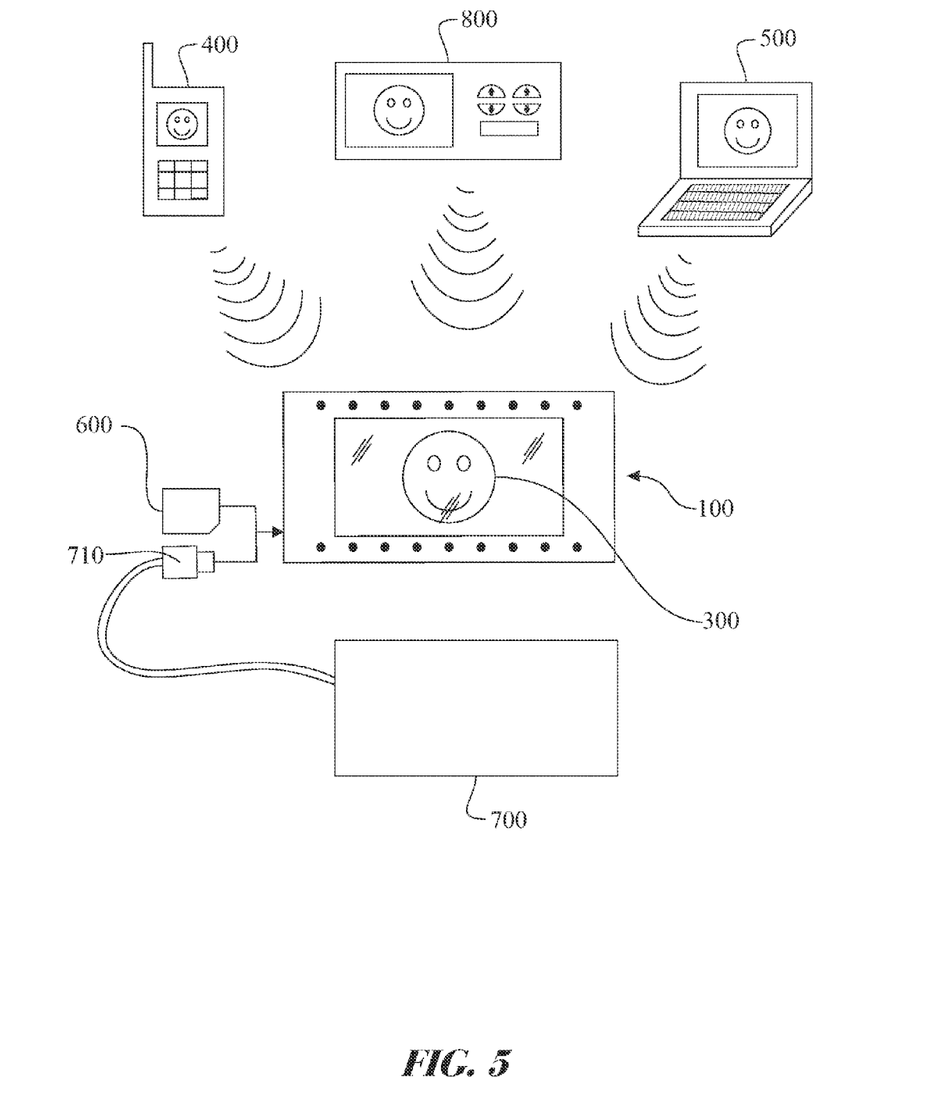

Digital images and/or text 300 may be transferred to the vehicle portable display unit 100 via the universal serial bus (USB) port 106 by directly inserting a secure digital (SD) card 600 containing said digital images and/or text 300. In addition, any universal serial bus (USB) storage device 700 such as a digital camera or USB hard drive may be used to transfer the digital images and/or text 300 to the vehicle portable display unit 100 via a universal serial bus (USB) cable 710. Digital images and/or text 300 may also be uploaded to the vehicle portable display unit 100 wirelessly from a cell phone 400 or computer 500 over a wireless transmission using radio frequency, Bluetooth, Wi-Fi, cellular telephone wireless protocols, or any other form of wireless communication. In addition to uploading digital images and/or text 300, the cell phone 400 and computer 500 may also control which digital image and/or text 300 is displayed on the vehicle portable display unit 100 via a series of commands communicated over any respective wireless protocol. For exemplary purposes, these commands are text messages sent from a cell phone 400 using standard cellular telephone wireless protocols or instructions sent from a computer program over Wi-Fi or Bluetooth protocols. A computer program capable of selecting and manipulating images may also be implemented to send data and commands to the vehicle portable display unit 100.

Figure 16:
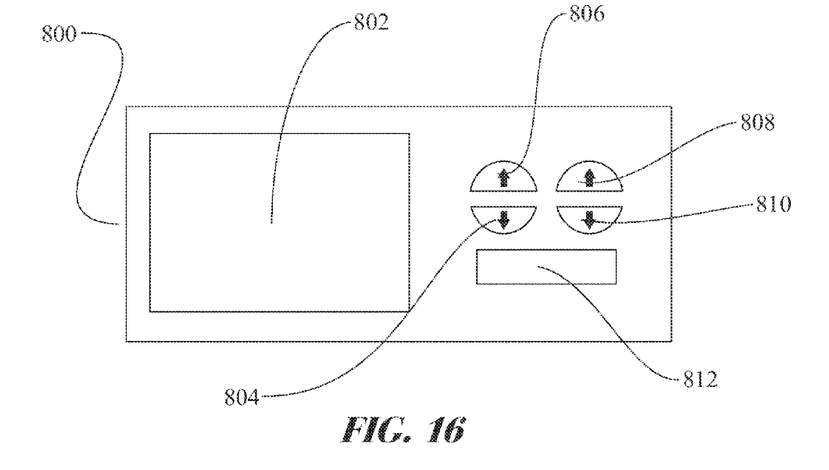
FIG. 16 presents a front view of an exemplary remote control, in accordance with the present invention.

A remote control 800 is also used in order to control the digital image and/or text 300, which is displayed on the vehicle portable display unit 100. The remote control 800 comprises a remote display 802 which displays the current digital image and/or text 300 shown on the vehicle portable display unit 100, a remote antenna 814, and is powered by a remote power supply 818 as detailed in FIGS. 16 and 17. The remote control 800 wirelessly communicates with the vehicle portable display unit 100 via the remote antenna 814. For illustrative purposes, the remote antenna 814 may transmit in Wi-Fi, Bluetooth, or any other wireless protocol frequencies to relay information to the vehicle portable display unit 100. The digital image and/or text 300, which are currently shown on the remote display 802, are transmitted from the vehicle portable display unit 100 via the remote antenna 814. Once received, the data is sent to a remote image control circuit 816 and then displayed on the remote display 802. The remote control 800 has at least one button to control the digital image and/or text 300. A next image button 808 sends a message to the vehicle portable display unit 100 indicating that the next available digital image and/or text 300 stored within the display screen 102 should be sent to the display screen 102. Likewise, a previous image button 810 can be implemented in the remote control 800 which sends a communication to the vehicle portable display unit 100 indicating to change the digital image and/or text 300 to that which was previously displayed. Both the next image button 808 and previous image button 810 are sent to the image selection input 822, which is connected to the remote image control circuit 816. A zoom in button 804 allows controlling the zoom of the digital image and/or text 300, while a zoom out button 806 reverses the zoom returning the digital image and/or text 300 to its' original dimensions. Both the input of the zoom in button 804 and zoom out button 806 is sent to the zoom input 820, which is also connected to the remote image control circuit 816. Commands sent to the remote image control circuit 816 are relayed to the vehicle portable display unit 100 via the remote antenna 814.

Figure 17:
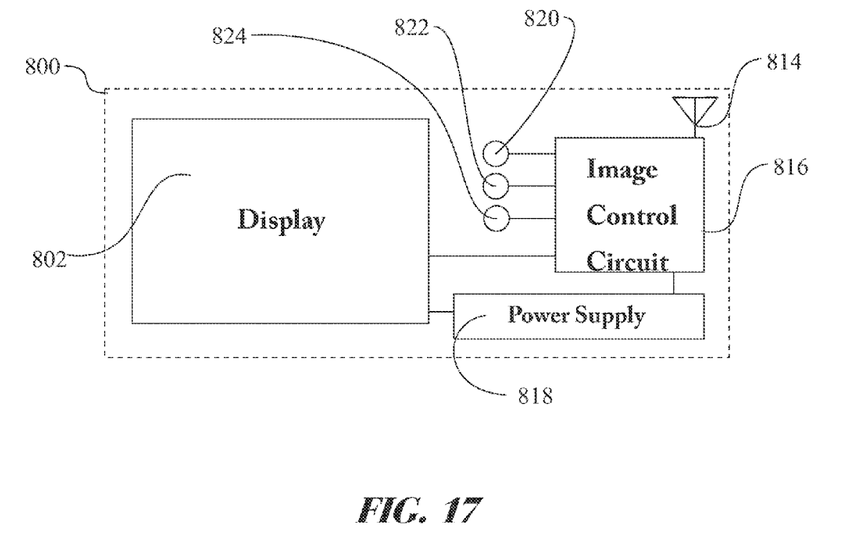
FIG. 17 presents a block diagram of the remote control, originally introduced in FIG. 12.

The vehicle portable display unit 100 may also act as a safety device. In the event of an emergency, such as theft, accident, or other incident, a special signal can be sent to the vehicle portable display unit 100 from the remote control 800 indicating panic. A panic button 812 activates a panic button input 824, which transmits a panic signal from the remote control 800 to the vehicle portable display unit 100. If this panic signal is received, the vehicle portable display unit 100 would be able to broadcast the current Global Positioning System (GPS) coordinates using the display unit antenna 122, immediately allowing authorities to locate the vehicle. The vehicle portable display unit 100 may also be used to display various alerts, such as an amber alert (notification of a missing child) or a silver alert (notification of a missing elderly individual).

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A portable display unit adapted for displaying an image to individuals outside of a vehicle, the display unit comprising:
    a digital display screen comprising a flat panel video display having a display left side, a display right side, a display upper edge, and a display lower edge;
    at least one light emitting component panel comprising a series of light emitting components, the at least one light emitting component panel being located proximate at least one of the display upper edge and the display lower edge, respectively;
    a left turn signal indicator and a right turn signal indicator;
    an image processing circuit in signal communication with the digital display screen and each at least one light emitting component panel;
    a digital storage device in signal communication with the image processing circuit;
    an input interface for transferring digital images to the digital storage device;
    a wireless interface for receiving wireless transmissions comprising operational control instructions;
    a display enclosure comprising an enclosure left side, an enclosure right side, an enclosure upper edge, an enclosure lower edge, and an enclosure rear surface collectively forming an enclosure interior volume for housing the digital display screen, the at least one light emitting component panel, and the wireless interface; and
    an attachment interface carried by and extending rearward from the display enclosure for removably securing the display enclosure to a vehicle.

2. A portable display unit as recited in claim 1, the attachment interface being selected from a group of attachment interfaces, including:
    a trailer shank,
    a suction cup;
    a window hanger comprising a curved portion located along an upper edge of the window hanger; and
    a magnet.

3. A portable display unit as recited in claim 1, the series of light emitting components are arranged in a spatial linear relation on at least one light emitting component panel.

4. A portable display unit as recited in claim 1, the series of light emitting components are arranged in a spatial linear relation on at least one light emitting component panel and located parallel to a proximate edge of the display screen.

5. A portable display unit as recited in claim 1, the portable display unit further comprising a trailer shank as the attachment interface and a trailer hitch electrical connector for providing electrical connectivity between a trailer hitch electrical connector of a vehicle and the image processing circuit.

6. A portable display unit as recited in claim 1, the left turn signal indicator being located proximate the display left side and a right turn signal indicator being located proximate the display right side.

7. A portable display unit as recited in claim 1, the left turn signal indicator being arranged in an arrow formation pointing towards a left side thereof and a right turn signal indicator being arranged in an arrow formation pointing towards a right side thereof.

8. A portable display unit adapted for displaying an image to individuals outside of a vehicle, the display unit comprising:

a digital display screen comprising a flat panel video display having a display left side, a display right side, a display upper edge, and a display lower edge;

a pair of light emitting component panels, each light emitting component panel comprising a series of light emitting components, one light emitting component panel being located proximate the display upper edge and the other light emitting component panel being located proximate the display lower edge;

a left turn signal indicator and a right turn signal indicator;

an image processing circuit in signal communication with the digital display screen and each at least one light emitting component panel;

a digital storage device in signal communication with the image processing circuit;

an input interface for transferring digital images to the digital storage device;

a wireless interface for receiving wireless transmissions comprising operational control instructions;

a display enclosure comprising an enclosure left side, an enclosure right side, an enclosure upper edge, an enclosure lower edge, and an enclosure rear surface collectively forming an enclosure interior volume for housing the digital display screen, the at least one light emitting component panel, and the wireless interface; and an attachment interface carried by and extending rearward from the display enclosure for removably securing the display enclosure to a vehicle.

9. A portable display unit as recited in claim 8, the attachment interface being selected from a group of attachment interfaces, including:
   a trailer shank,
   a suction cup;
   a window hanger comprising a curved portion located along an upper edge of the window hanger; and
   a magnet.

10. A portable display unit as recited in claim 8, the series of light emitting components are arranged in a spatial linear relation on at least one light emitting component panel.

11. A portable display unit as recited in claim 8, the series of light emitting components are arranged in a spatial linear relation on at least one light emitting component panel and located parallel to a proximate edge of the display screen.

12. A portable display unit as recited in claim 8, the left turn signal indicator being located proximate the display left side and a right turn signal indicator being located proximate the display right side.

13. A portable display unit as recited in claim 8, the left turn signal indicator being arranged in an arrow formation pointing towards a left side thereof and a right turn signal indicator being arranged in an arrow formation pointing towards a right side thereof.

14. A portable display unit adapted for displaying an image to individuals outside of a vehicle, the display unit comprising:
   a digital display screen comprising a flat panel video display having a display left side, a display right side, a display upper edge, and a display lower edge;
   a right turn signal indicator located along a right portion of the portable display unit;
   a left turn signal indicator located along a left portion of the portable display unit;
   an image processing circuit in signal communication with the digital display screen and each at least one light emitting component panel;
   a digital storage device in signal communication with the image processing circuit;
   an input interface for transferring digital images to the digital storage device;
   a wireless interface for receiving wireless transmissions comprising operational control instructions;
   a display enclosure comprising an enclosure left side, an enclosure right side, an enclosure upper edge, an enclosure lower edge, and an enclosure rear surface collectively forming an enclosure interior volume for housing the digital display screen, the at least one light emitting component panel, and the wireless interface; and
   an attachment interface carried by and extending rearward from the display enclosure for removably securing the display enclosure to a vehicle.

15. A portable display unit as recited in claim 14, the left turn signal indicator being arranged in an arrow formation pointing towards a left side thereof and the right turn signal indicator being arranged in an arrow formation pointing towards a right side thereof.

16. A portable display unit as recited in claim 14, the left turn signal indicator comprising a series of light emitting components located on the left side of the portable display unit and the right turn signal indicator comprising a series of light emitting components located on the right side of the portable display unit.

17. A portable display unit as recited in claim 14, the attachment interface being selected from a group of attachment interfaces, including:
   a trailer shank,
   a suction cup;
   a window hanger comprising a curved portion located along an upper edge of the window hanger; and
   a magnet.

18. A portable display unit as recited in claim 14, the portable display unit further comprising a trailer shank as the attachment interface and a trailer hitch electrical connector for providing electrical connectivity between a trailer hitch electrical connector of a vehicle and the image processing circuit.

* * * * *